United States Patent
Yang

(10) Patent No.: US 8,159,111 B2
(45) Date of Patent: Apr. 17, 2012

(54) DRIVING DEVICE AND PROTECTION METHOD THEREOF

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/468,808

(22) Filed: May 19, 2009

(65) Prior Publication Data

US 2010/0226052 A1 Sep. 9, 2010

(30) Foreign Application Priority Data

Mar. 3, 2009 (CN) .......................... 2009 1 0300662

(51) Int. Cl.
*B25B 23/14* (2006.01)
*H02N 2/10* (2006.01)

(52) U.S. Cl. ... 310/317; 310/318; 310/319; 310/323.06; 73/862.23; 73/862.29; 361/33

(58) Field of Classification Search .................. 361/33, 361/6, 23; 318/432, 434; 310/323.06, 325, 310/328, 311, 317, 318, 319; 73/862.23, 73/862.29

See application file for complete search history.

(56) References Cited

U.S. PATENT DOCUMENTS

| | | | | |
|---|---|---|---|---|
| 3,612,966 A * | 10/1971 | Dybel | ........................... | 361/170 |
| 4,735,271 A * | 4/1988 | Shimizu | ........................ | 180/446 |
| 4,805,463 A * | 2/1989 | Kelledes et al. | ......... | 73/862.331 |
| 5,780,751 A * | 7/1998 | Nomerange et al. | ...... | 73/862.325 |
| 5,811,695 A * | 9/1998 | Satoh et al. | ............... | 73/862.331 |
| 5,821,669 A * | 10/1998 | Shin | ........................ | 310/323.03 |
| 6,448,729 B1 * | 9/2002 | Davies et al. | ................. | 318/434 |
| 6,452,351 B1 * | 9/2002 | Hopson et al. | ................. | 318/432 |
| 6,664,710 B1 * | 12/2003 | Gottlieb et al. | ........... | 310/323.02 |
| 6,679,123 B2 * | 1/2004 | Lec | ................................... | 73/769 |
| 6,888,288 B2 * | 5/2005 | Seki et al. | ................ | 310/323.16 |

* cited by examiner

*Primary Examiner* — Rita Leykin
(74) *Attorney, Agent, or Firm* — Altis Law Group, Inc.

(57) ABSTRACT

A driving device includes a motor, a clutch gear, a first rotating portion, a second rotating portion, a piezoelectric assembly, and a controlling unit. The motor includes a rotating shaft. The clutch gear is fixed to the rotating shaft. The first rotating portion sleeved on the rotating shaft includes a first end meshing with the clutch gear and a second end opposite to the first end. The second rotating portion is engaged with the second end. The piezoelectric assembly is sandwiched between the second end and the second rotating portion. The controlling unit is electrically connected to the motor and the piezoelectric assembly. The controlling unit is configured for storing a predetermined voltage, and determining whether a voltage output by the piezoelectric assembly equals to or exceeds the predetermined voltage. A protection method for the driving device is also provided.

8 Claims, 5 Drawing Sheets

DRIVING DEVICE AND PROTECTION METHOD THEREOF

BACKGROUND

1. Technical Field

The present disclosure relates to driving technology and, particularly, to a driving device and a protection method thereof.

2. Description of Related Art

Motors are found in many appliances. In these appliances, it is not uncommon that the load on these motors suddenly increases and goes beyond the power rating of the motors. In these cases, the motors are overloaded while still powered on, and the motors can be damaged under this condition.

Therefore, what is needed is to provide a driving device and a protection method thereof, in which the above-mention problem is eliminated or at least alleviated.

DETAILED DESCRIPTION

Figure 1:
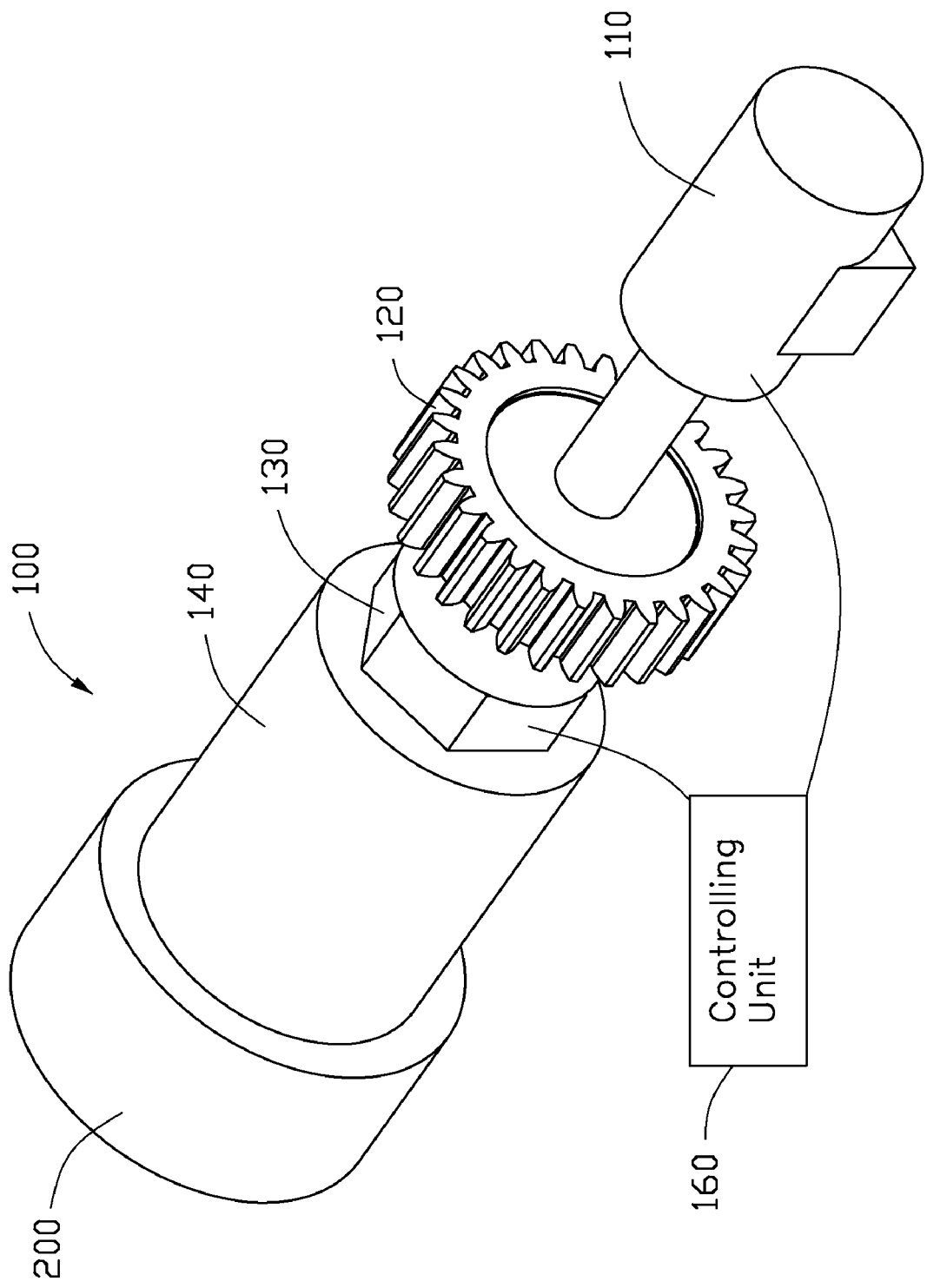
FIG. 1 is a schematic isometric view of a driving device including a controlling unit, according to a first exemplary embodiment.
Figure 2:
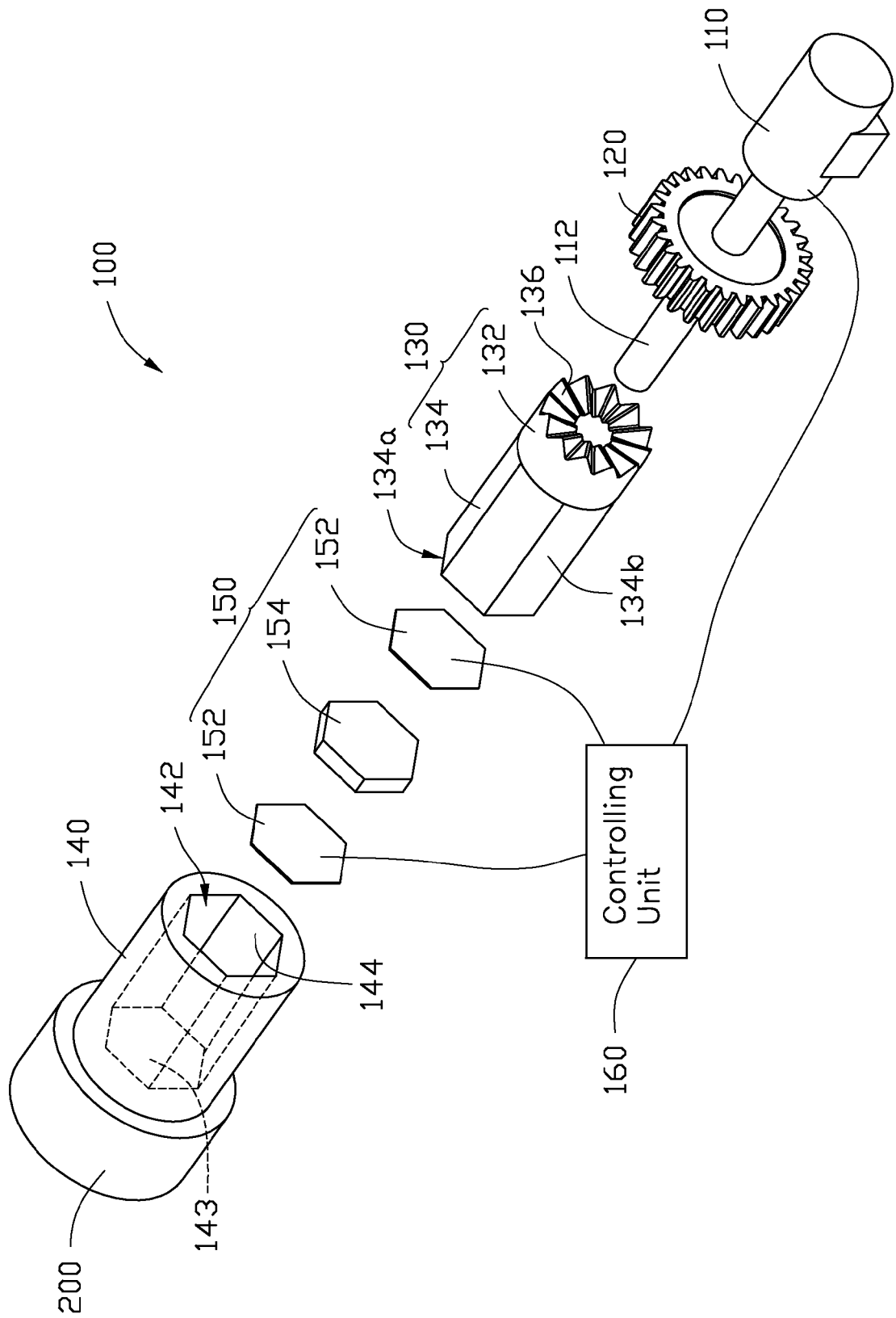
FIG. 2 is an exploded schematic isometric view of the driving device of FIG. 1.
Figure 3:
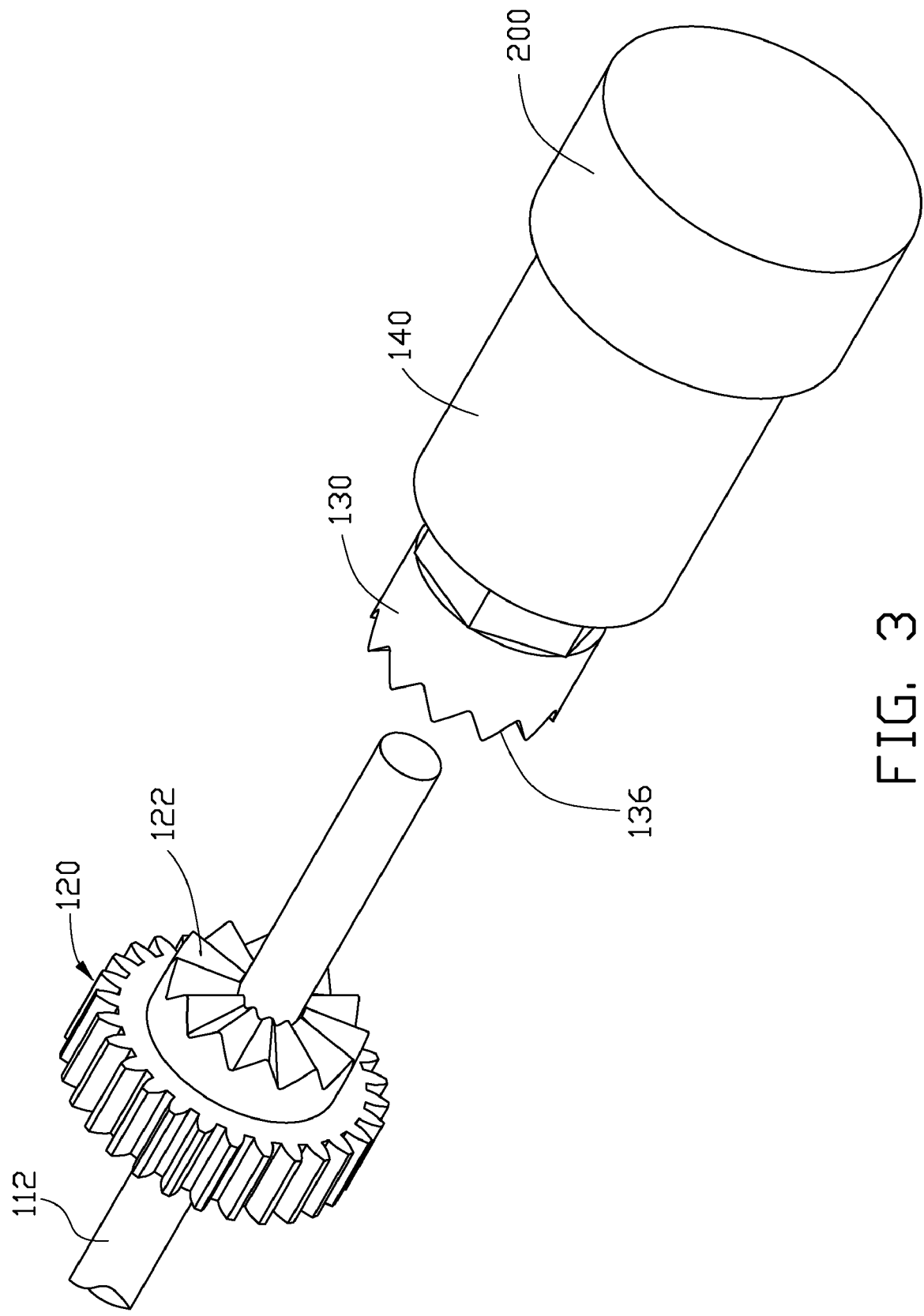
FIG. 3 is a partial exploded schematic isometric view of the driving device of FIG. 1, but viewed from another angle.

Referring to FIGS. 1-3, a driving device 100, according to a first exemplary embodiment, includes a motor 110, a clutch gear 120, a first rotating portion 130, a second rotating portion 140, a piezoelectric assembly 150, and a controlling unit 160. The motor 110 includes a rotating shaft 112, which rotates when the motor 110 is powered on. The clutch gear 120 is fixed to the rotating shaft 112 and rotates with the rotating shaft 112. A number of teeth 122 (FIG. 3) are formed in one side of the clutch gear 120.

The first rotating portion 130 is hollow and sleeved on the rotating shaft 112. The first rotating portion 130 includes a first end 132 and a second end 134. The first end 132 is a cylinder. A number of teeth 136 are formed in an end surface of the first end 132 to mesh with the number of teeth 122 of the clutch gear 120. The first rotating portion 130 is rotated following the rotation of the clutch gear 120 and is pressed by an axial force from the clutch gear 120 to move toward the second rotating portion 140. The shape of the second end 134 is approximately a regular-hexagonal-prism. The second end 134 includes an outer bottom surface 134a and six outer side surfaces 134b.

The second rotating portion 140 is a hollow cylinder, and coupled to a load 200. A receiving cavity 142 is defined in the second rotating portion 140, corresponding to the first rotating portion 130. The shape of the receiving cavity 142 is approximately a regular-hexagonal-prism corresponding to the first rotating portion 130 so that the second rotating portion 140 can engagingly mate with the first rotating portion 130 and be driven by the first rotating portion 130 to rotate. The receiving cavity 142 is bounded by an inner bottom surface 143 and six inner side surfaces 144 of the second rotating portion 140. The inner bottom surface 143 corresponds to the outer bottom surface 134a. The six inner side surfaces 144 correspond to the six outer side surfaces 134b, respectively.

The piezoelectric assembly 150 is sandwiched between the outer bottom surface 134a and the inner bottom surface 143. The piezoelectric assembly 150 is capable of sensing the axial force applied to the second rotating portion 140 by the first rotating portion 130 and the piezoelectric assembly 150 is capable of converting the axial force into a voltage. In this embodiment, the piezoelectric assembly 150 includes two electrode plates 152 and a piezoelectric plate 154 sandwiched between the two electrode plates 152. When the second rotating portion 140 is rotated by the first rotating portion 130, the first rotating portion 130 is pressed by the clutch gear 120 to apply the axial force on the second rotating portion 140, as a result, the piezoelectric plate 154 becomes deformed and outputs the voltage indicative of the intensity of the axial force by the two electrode plates 152.

Figure 4:
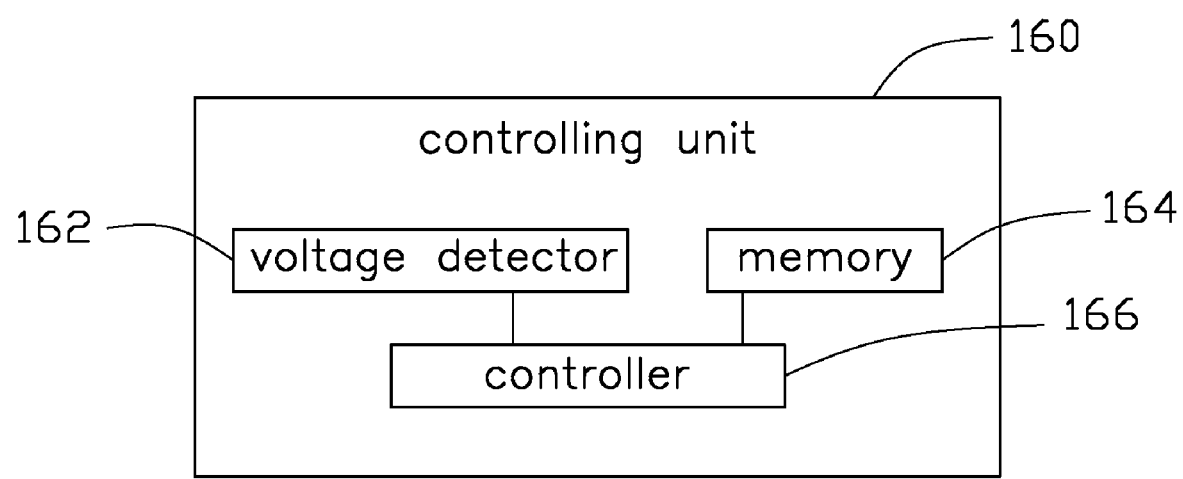
FIG. 4 is a functional block diagram of the controlling unit of FIG. 1.

The controlling unit 160 is electrically connected to the two electrode plates 152 and the motor 110. Referring to FIG. 4 together with FIG. 2, the controlling unit 160 includes a voltage detector 162, a memory 164, and a controller 166.

The voltage detector 162 is configured for detecting the voltage output by the piezoelectric plate 154 by the electrode plates 152. The memory 164 is configured for storing a predetermined voltage. The controller 166 is configured for determining whether the voltage equals to or exceeds the predetermined voltage, and for controlling the motor 110 accordingly. If the voltage equals to or exceeds the predetermined voltage, the controller 166 deactivates, e.g., powers off, the motor 110 and can reactivate the motor 110 after a predetermined time interval to detect whether the motor 110 is still overloaded. If the motor 110 is still overloaded, the motor 110 is deactivated again. The controller 166 will activate and deactivate the motor 110 repetitiously until the motor 110 is no longer overloaded. Then the motor 110 will remain activated. The predetermined voltage can be determined by the following experiment: initially, the motor 110 is activated by the controller 166 to drive a light load 200 through the first and second rotating portions 130, 140. Then the load 200 is gradually increased until the motor 110 becomes overloaded (stopped). Upon this condition, the output voltage of the piezoelectric assembly 150 is defined as the predetermined voltage.

Figure 5:
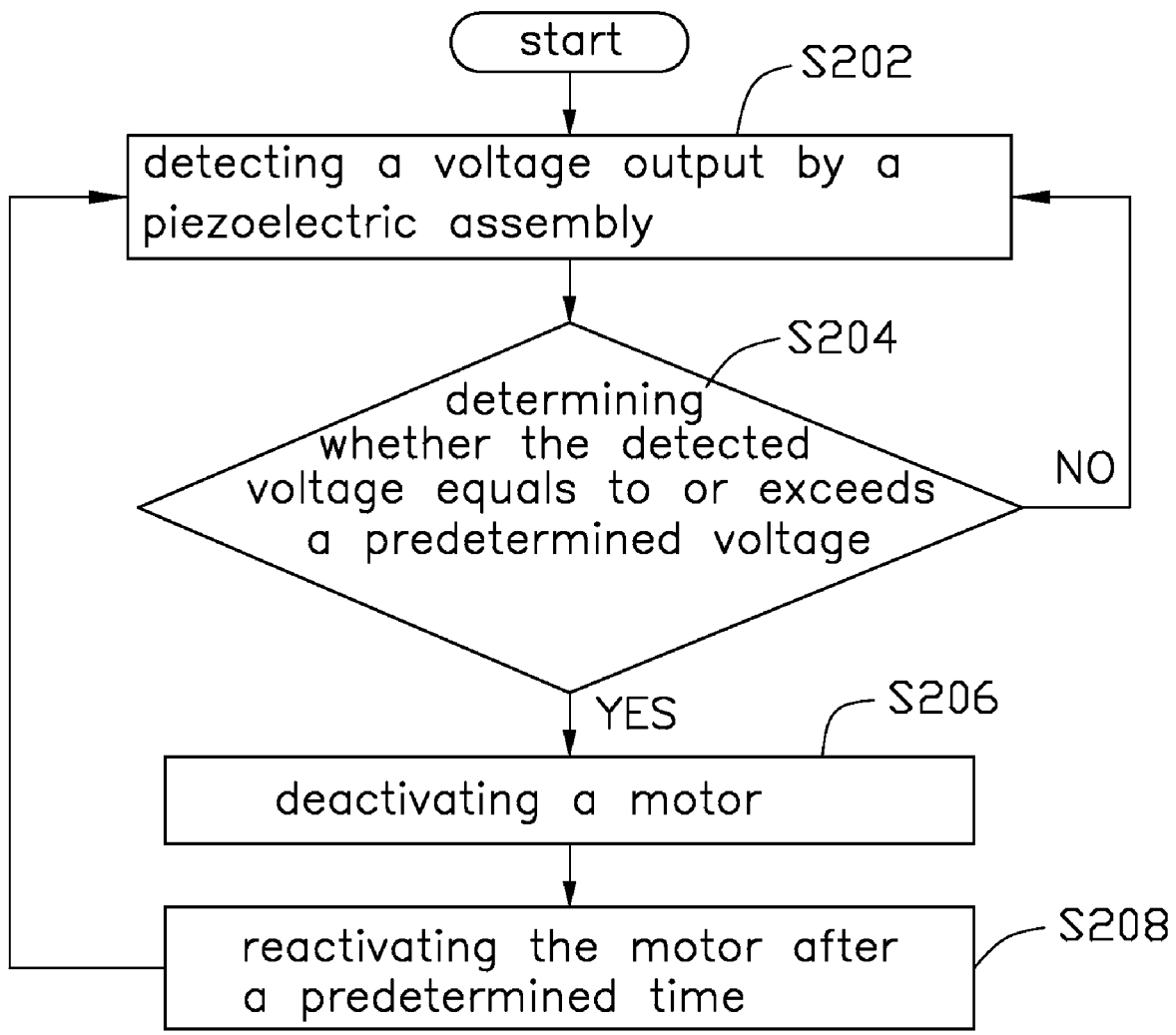
FIG. 5 is a flowchart of a protection method, according to a second exemplary embodiment.

Referring to FIG. 5, a protection method for protecting a motor according to a second exemplary embodiment includes steps S202 through S208. Step S202: detecting a voltage output by a piezoelectric assembly. Step S204: determining whether the detected voltage equals to or exceeds a predetermined voltage. If the detected voltage is less than the predetermined voltage, return to step S202. If the detected voltage is equal to or exceeds the predetermined voltage, go to step S206. Step S206: deactivating a motor if the detected voltage equals to or exceeds the predetermined voltage. Step S208: reactivating the motor after a predetermined time and going back to step S202. If the detected voltage equals to or exceeds the predetermined voltage, the motor is deactivated and the process is repeated. The protection method can be carried out by the driving device 100 of the above embodiment.

The driving device 100 can deactivate the motor 110 if the motor 110 is overloaded. Therefore, the driving device 100 can provide protection for the motor 110.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A driving device comprising:
a motor comprising a rotating shaft;
a clutch gear fixed to the rotating shaft;
a first rotating portion sleeved on the rotating shaft corresponding to the clutch gear, the first rotating portion comprising a first end meshing with the clutch gear and a second end opposite to the first end;
a second rotating portion engaged with the second end of the first rotating portion, wherein the first rotating portion is rotated following the rotation of the clutch gear and is pressed by an axial force from the clutch gear to move toward the second rotating portion;
a piezoelectric assembly sandwiched between the second end of the first rotating portion and the second rotating portion so that the piezoelectric assembly is capable of sensing the axial force applied to the second rotating portion by the first rotating portion, the piezoelectric assembly being capable of converting the axial force into a voltage; and
a controlling unit electrically connected to the motor and the piezoelectric assembly, the controlling unit configured for storing a predetermined voltage, and for determining whether the voltage output by the piezoelectric assembly equals to or exceeds the predetermined voltage and for deactivating the motor if the voltage output by the piezoelectric assembly equals to or exceeds the predetermined voltage.

2. The driving device as claimed in claim 1, wherein the first end is a cylinder, and a plurality of teeth are formed in the first end to mesh with the clutch gear.

3. The driving device as claimed in claim 1, wherein the shape of the second end is approximately a regular-hexagonal-prism, the second end comprises an outer bottom surface, a receiving cavity is defined in the second rotating portion corresponding to the first rotating portion, the second rotating portion comprises an inner bottom surface in the receiving cavity, and the piezoelectric assembly is sandwiched between the outer bottom surface and the inner bottom surface.

4. The driving device of claim 1, wherein the piezoelectric assembly comprises two electrode plates and a piezoelectric plate sandwiched between the two electrode plates.

5. The driving device of claim 1, wherein the controlling unit comprises a voltage detector configured for detecting the voltage output by the piezoelectric assembly, a memory configured for storing the predetermined voltage and a controller configured for determining whether the detected voltage equals to or exceeds the predetermined voltage and deactivating the motor if the detected voltage equals to or exceeds the predetermined voltage.

6. A protection method for a driving device, the driving device comprising a motor comprising a rotating shaft, a clutch gear fixed to the rotating shaft, a first rotating portion sleeved on the rotating shaft, a second rotating portion engaged with the first rotating portion, the first rotating portion being configured to follow the rotation of the clutch gear and to move toward the second rotating portion when pressed by an axial force from the clutch gear, and a piezoelectric assembly sandwiched between the first rotating portion and the second rotating portion, the method comprising:
sensing the axial force applied to the second rotating portion by the first rotating portion using the piezoelectric assembly;
converting the axial force into a voltage by the piezoelectric assembly;
detecting the voltage output by the piezoelectric assembly;
determining whether the detected voltage equals to or exceeds a predetermined voltage; and
deactivating the motor if the detected voltage equals to or exceeds the predetermined voltage.

7. The protection method of claim 6, further comprising repeating the step of detecting the voltage output by the piezoelectric assembly if the detected voltage is lower than the predetermined voltage.

8. The protection method of claim 6, further comprising reactivating the motor after a predetermined time and repeating the step of detecting the voltage output by the piezoelectric assembly.

* * * * *